(12) United States Patent
Pope et al.

(10) Patent No.: US 8,675,099 B2
(45) Date of Patent: *Mar. 18, 2014

(54) EFFICIENT SYSTEM AND METHOD FOR FACE TRACKING

(75) Inventors: David R. Pope, Fremont, CA (US); Graham Kirsch, Bramley (GB); Anthony Huggett, Sherborne St. John (GB)

(73) Assignee: Aptina Imaging Corporation, George Town (KY)

( * ) Notice: Subject to any disclaimer, the term of this patent is extended or adjusted under 35 U.S.C. 154(b) by 292 days.

This patent is subject to a terminal disclaimer.

(21) Appl. No.: 13/081,720

(22) Filed: Apr. 7, 2011

(65) Prior Publication Data

US 2011/0182474 A1    Jul. 28, 2011

Related U.S. Application Data

(63) Continuation-in-part of application No. 12/544,842, filed on Aug. 20, 2009, now Pat. No. 8,345,125.

(60) Provisional application No. 61/435,722, filed on Jan. 24, 2011.

(30) Foreign Application Priority Data

Jun. 16, 2009 (GB) .................................. 0910386.2

(51) Int. Cl.
*H04N 5/262* (2006.01)

(52) U.S. Cl.
USPC ....................................... 348/239; 348/222.1

(58) Field of Classification Search
USPC ................................ 348/239, 222.1; 382/103
See application file for complete search history.

(56) References Cited

U.S. PATENT DOCUMENTS

2005/0264658 A1*  12/2005  Ray et al. ...................... 348/239
2012/0320239 A1*  12/2012  Uehara ......................... 348/239

FOREIGN PATENT DOCUMENTS

JP      2002152587 A      5/2002
WO    WO 2007140523 A1    12/2007
WO    WO 2006001525 A1     5/2009

OTHER PUBLICATIONS

Artyomov et al., "Morton (Z) Scan Based Real-Time Variable Resolution CMOS Image Sensor" IEEE Transactions on Circuits and Systems for Video Technology, vol. 15, No. 7, pp. 145-148.

(Continued)

*Primary Examiner* — Tuan Ho

(57) ABSTRACT

A method of scanning a scene using an image sensor includes (a) dividing the scene into multiple first portions; and scanning a first portion for presence of objects in an object class. The method further includes continuing the scanning of the multiple first portions for presence of other objects in the scene. The method also selects a second portion of the scene, in response to detecting an object in the first portion; and then tracking the object in the selected second portion. The second portion of the scene is selected based on estimating motion of the object detected in the first portion, so that it may still be located in the second portion.

20 Claims, 11 Drawing Sheets

(56) References Cited

OTHER PUBLICATIONS

Yan et al., "The Practical Method of Fractal Dimensionality Reduction Based on Z-Ordering Techniques" Advanced Data Mining and Applications, Second International Conference, 2006, pp. 542-549.

Julien Meynet, "Fast Face Detection Using ADS Boost" Technical Report, Jul. 16, 2003, pp. 1-94.

Yoav Freund and Robert E. Schapire, "A Decision-Theorectic Generalization of On-Line Learning and an Application to Boosting", ATT & T Bell Laboratories, Sep. 20, 1995, pp. 1-34.

Yoav Freund and Robert E. Schapire, "A Short Introduction to Boosting" Journal of Japanese Society for Artificial Intelligence, Sep. 1999, 14(5):771-780.

* cited by examiner

US 8,675,099 B2

EFFICIENT SYSTEM AND METHOD FOR FACE TRACKING

CROSS REFERENCE TO RELATED APPLICATIONS

This application claims priority to U.S. Provisional Patent Application No. 61/435,722, filed Jan. 24, 2011. This application is also a continuation-in-part of U.S. Patent Application No. 2010/0315523, published Dec. 16, 2010, which claims priority to G. B. Patent Application No. 0910386.2, filed Jun. 16, 2009. The contents of these applications are incorporated herein in their entireties by reference.

FIELD OF THE INVENTION

This invention is directed to systems and methods for capturing and analyzing a scene using an image sensor. More specifically, the present invention is directed to separately detecting and tracking one or more faces in a scene.

BACKGROUND OF THE INVENTION

Modern cameras and other image capturing devices offer a wide variety of capabilities, such as automatic exposure, color balancing, and open eye detection. These capabilities depend on the camera's ability to determine where the regions of interest are in the scene, such as the location and size of the faces.

To determine the location and size of these objects, cameras typically include a dedicated memory that is large enough to store an entire frame of the scene. This dedicated memory is often referred to as a "framestore" and can be undesirably large and area-consuming. Once an entire frame is stored in the framestore, a high-power processor repeatedly fetches and analyzes data from the framestore to identify the faces (or other objects) of interest. This process of identifying objects may take up a large proportion of the processing time and power in a camera.

DETAILED DESCRIPTION OF THE INVENTION

Figure 1:
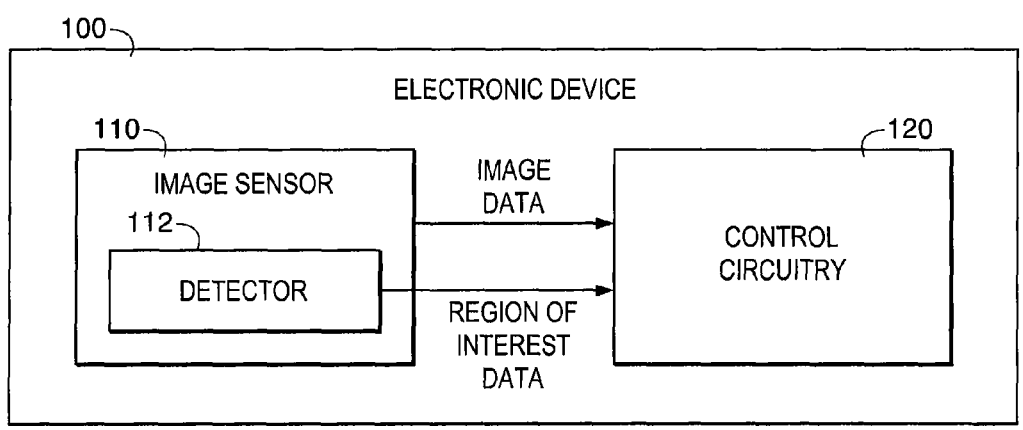
FIG. 1 is a schematic view of an illustrative electronic device configured in accordance with embodiments of the invention.

FIG. 1 is a schematic view of an illustrative electronic device configured in accordance with embodiments of the invention. Electronic device 100 can be any type of user device that utilizes an image sensor (embodied here as image sensor 110) and is controlled generally by control circuitry 120. For example, electronic device 100 can include a camera, such as a computer camera, still camera, or portable video camera. Electronic device 100 can also include any other components in a typical camera (or otherwise), which are not depicted in FIG. 1 to avoid any distraction from embodiments of the invention.

Image sensor 110 can capture image data (e.g., pixels) corresponding to a scene. A "scene" hereinafter refers to a streaming image that can be captured in the frame of a camera. Image sensor 110 may include detector 112 for identifying relevant information about the scene. For example, detector 112 may analyze the image data for the presence of particular objects. These objects may belong to a particular object class, such as faces.

As used herein, an "object class" may refer to a collection of objects sharing common attributes, but where individual objects in the collection may appear differently. For example, faces may be an object class, because although each individual face is distinguishable from other faces, faces have a number of characteristic features such as two eyes, a nose, a mouth, and a chin. Another example of an object class is a bird object class (e.g., with characteristic features of a beak and two wings). For simplicity, the various embodiments disclosed herein will be described in terms of detecting faces. However, it should be understood that this is merely illustrative, and that objects of any other object class may be detected instead (e.g., birds or other animals).

Detector 112 may detect the presence of faces, and can provide relevant information about any of the detected faces to control circuitry 120. The relevant information is identified in FIG. 1 as "region of interest data," and can include positional information about the detected faces, such as the general location of the faces (e.g., x,y coordinates), the size of the faces, and how confident image sensor 110 is of the presence of the faces at each location.

Control circuitry 120 may process the image data and region of interest data generated by sensor 110, and may perform any suitable operations based on this data. For example, because users of electronic device 100 may want faces to remain clear and bright, control circuitry 120 can perform automatic exposure, color balancing, or focus control (or any combination thereof) based on the provided positional information of the detected faces. In some embodiments, control circuitry 120 can identify further contextual information about the detected faces, such as information on whether the faces include open eyes and/or a smile. In these or other embodiments, control circuitry 120 can provide or update system functions based on the detected faces. For example, if electronic device 100 includes a computer and a computer camera (e.g., webcam), control circuitry 120 may be configured to wake up a "hibernating" computer in response to detecting that a face is present in front of the computer camera. This way, the user does not need to perform any express actions to wake-up the computer.

Because control circuitry 120 is provided with positional information about the faces in a scene, control circuitry 120 may not need to perform any face detection functions itself. Thus, in some embodiments, substantial processing time and power may be saved, since control circuitry 120 may immediately (if desired) begin performing the above-described capabilities, such as automatic exposure, color balancing, and focus control.

Detector 112 (or image sensor 110 in general) and control circuitry 120 may be implemented using any suitable combination of hardware and software. In some embodiments, detector 112 can be implemented substantially all in hardware. For example, image sensor 110 may be implemented as a system-on-a-chip (SoC). This way, detector 112 can have a small design that minimizes the area of image sensor 110, and detector 112 may have circuit components designed to maximize the speed of operation. Control circuitry 120 may include, for example, one or more processors, microprocessors, ASICS, FPGAs, or any suitable combination of hardware and software.

Figure 2:
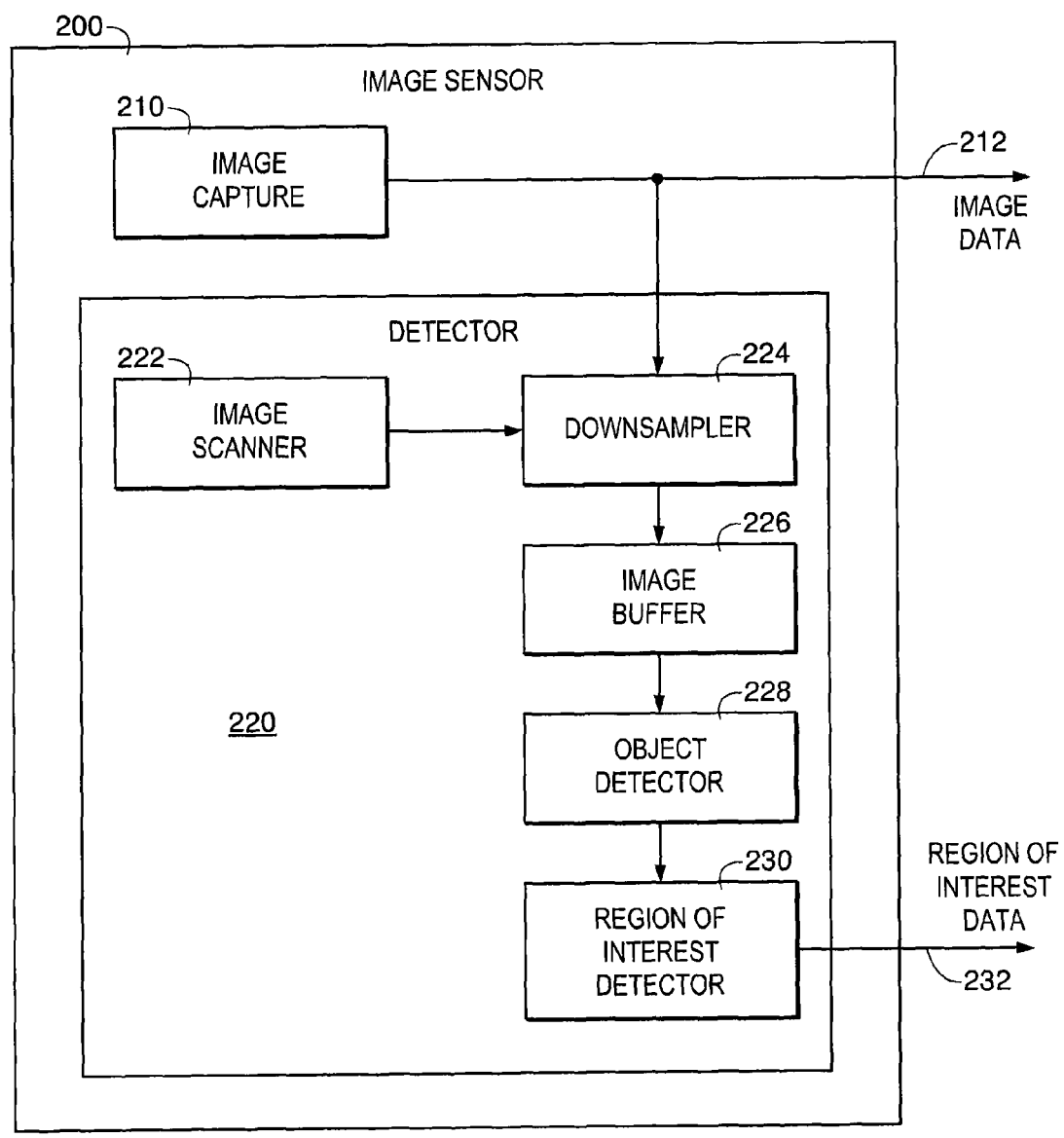
FIG. 2 is a schematic view of an illustrative image sensor configured in accordance with embodiments of the invention.

Referring now to FIG. 2, a schematic view of image sensor 200 is shown, which may be configured in accordance with embodiments of the invention. Image sensor 200 may or may not have any of the features and functionalities of image sensor 110 of FIG. 1 (and vice versa). In some embodiments, image sensor 110 can include image capture module 210 and detector 220. Detector 220 can include any of the features or functionalities of detector 112 of FIG. 1 (and vice versa).

Image capture module 210 can include any combination of lenses, arrays of cells (e.g., charge-coupled devices (CCDs) or CMOS sensor cells), and any other suitable components. Using these components, image capture module 210 can generate image data (e.g., pixels) corresponding to a scene. In some embodiments, image capture module 210 may provide the image data corresponding to a scene in raster order and at any suitable frame rate (e.g., 15 or 28 frames per second).

Image sensor 200 can include a first output 212 for outputting the image data generated by image capture module 210. In some embodiments, detector 220 can tap into the output of image capture module 210. Detector 220 may only need the luminance information to detect the presence of faces, and therefore (in some embodiments), detector 220 may tap into just the luminance channel of the image data (e.g., Y channel, G channel of RBG image, or Gr/Gb channels). To perform the task of detecting faces, detector 220 can include image scanner 222, downsampler 224, image buffer 226, object detector 228, and region of interest buffer 230.

As discussed above, image capture module 210 may repeatedly provide pixels for an entire frame of a scene in successive time intervals (e.g., every 0.033 seconds for a 30 frames per second frame rate). Image scanner 222 can control which portion of the scene is scanned and stored into image buffer 226 at each time interval. In some embodiments, image scanner 222 may select a sequence of different portions that each covers a different location or amount of the scene. This way, while each individual portion does not provide information about the entire scene, all of the selected portions may collectively provide sufficient coverage of the scene. Using this approach, image scanner 222 can search the full scene over a longer period of time so that only a portion of the scene (rather than the entire scene) is saved in image buffer 226 at one time. The remaining components and various details of image sensor 200 will be described in greater detail below.

Figure 3:
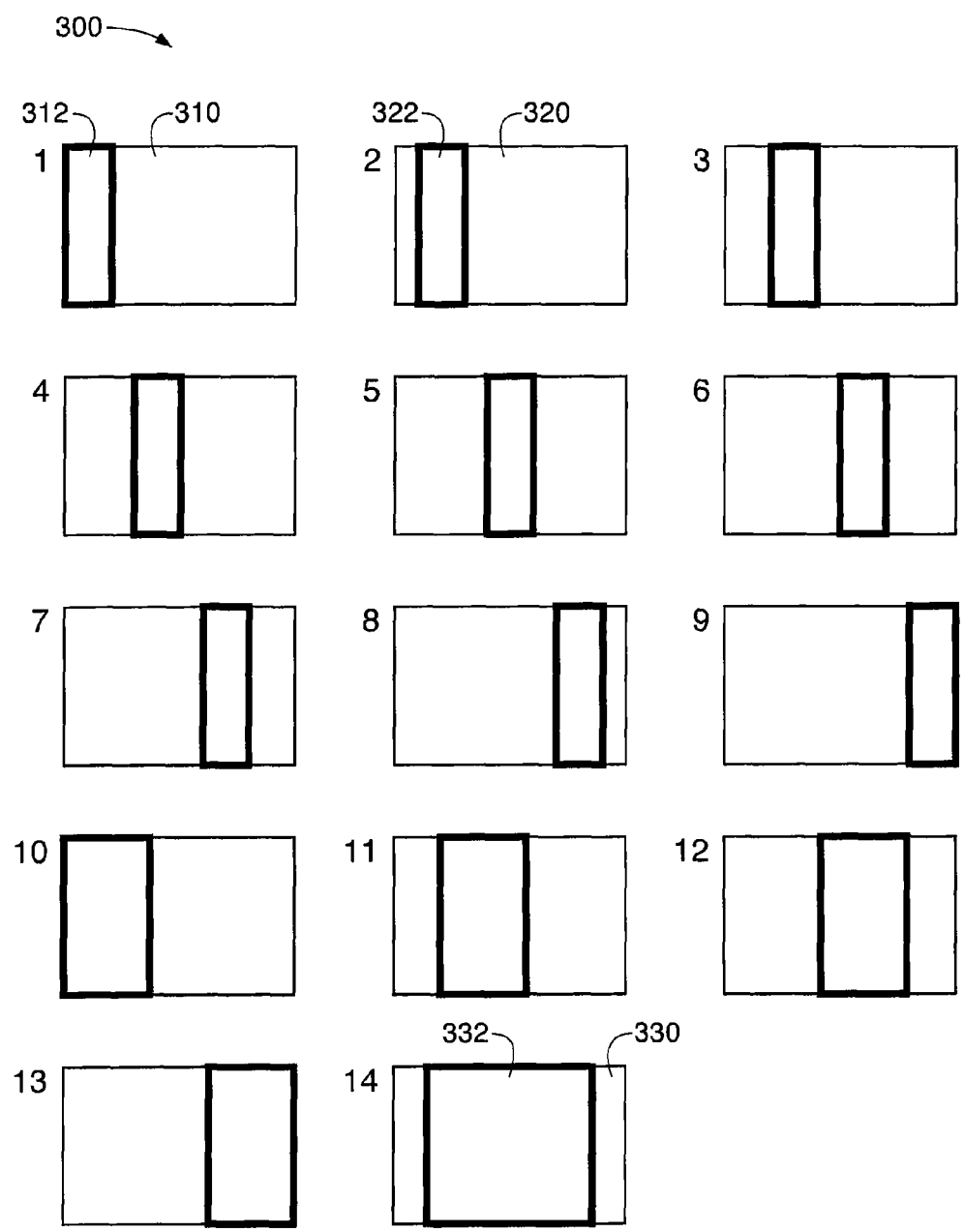
FIG. 3 illustrates various scanning stripes that can be used to capture a scene in successive time intervals in accordance with embodiments of the invention.

First, FIG. 3 will be described with continued reference to image scanner 222 of FIG. 2. FIG. 3 shows one example of a sequence 300 of portions that image scanner 222 can select in successive frames. Sequence 300 can include 14 portions, which may be selected in 14 successive time intervals (e.g., successive frames). For example, image scanner 222 may select portion 312 of scene 310 during a first raster scan of the scene, portion 322 of scene 320 during a second raster scan of the scene, all the way until portion 332 of scene 330 during a fourteenth raster scan of the scene.

As shown in FIG. 3, the portions in sequence 300 may be vertical stripes that extend from the top to the bottom of the frame, but may not cover the entire width of the scene. Each of the vertical stripes may differ from the other vertical stripes in width, area, or both. For example, the first nine vertical stripes may have the same width, but different horizontal offsets. The next four vertical stripes may have a larger width, again with different horizontal offsets. The final, fourteenth vertical stripe may have a width even larger than the width of the previous thirteen vertical stripes. While scan shapes other than vertical stripes may be used, for simplicity, the various embodiments will be described in terms of scanning vertical stripes. It should be understood that this is merely illustrative and is not intended to be limiting. For example, vertical stripes that do not span all of the rows, or are of limited vertical extent, may be used instead.

The vertical stripes of sequence 300 in FIG. 3 may be chosen to provide sufficient coverage of the scene. More particularly, the widths and horizontal offsets of the stripes can be selected such that faces at different positions and of different sizes may be detectable by image sensor 200 (FIG. 2). The stripes with smallest width, for example, can be used to detect smaller faces (e.g., faces of people far away from the camera), while the stripes with larger widths may be useful for detecting larger faces (e.g., faces of people closer to the camera). In embodiments where frames are scanned at 15 frames per second, the 14 scan stripes of FIG. 3 may be completed within one second. This way, provided the people in the scene do not move a significant amount in one second (which is likely, particularly if they are posing for a camera), any positional information generated by image sensor 200 should remain valid after sequence 300 is completed.

Image scanner 222 can use any number of vertical stripes in each sequence, and not just 14 vertical stripes. As discussed above, the number of stripes may be selected to cover the enter scene. In some embodiments, the number of vertical stripes may be chosen based on the number of columns in the image and/or the scale of the highest resolution scan performed (or equivalently, the width of the narrowest vertical stripe). For example, the number of vertical stripes of each resolution may be chosen such that each vertical stripe is 64*S pixels wide and such that the vertical stripes overlap one another by 32*S pixels. Here, S may represent a number referred to as a "scale" and may be greater for wider vertical stripes. As will become apparent below, this may allow image scanner 222 to provide sufficient coverage of the scene at each scale.

In some embodiments, image scanner 222 can scan a scene using a predetermined sequence of vertical stripes. For example, image scanner 222 may be configured to follow the sequence 300 of FIG. 3 regardless of the detection results of detector 220 (or other factors). In other embodiments, image scanner 222 may not follow a predetermined sequence, and may instead select the width and position of the vertical stripes in an adaptive manner. For example, if detector 220 determines that a face is present in one of the vertical stripes, image scanner 222 may select vertical stripes that are the same or are similar (e.g., in width and/or position) as that vertical stripe. This way, image scanner 222 may attempt to follow the person's face as he or she moves around the scene.

Returning to FIG. 2, in some embodiments, image scanner 222 can control the scan sequence by providing scan settings to downsampler 206 at each time interval. The scan settings can include, for example, the position (e.g., horizontal offset or x,y coordinates) and width (e.g., downsampling rate) of the vertical stripes. Using the scan settings, downsampler 224 can sub-sample a portion the image data at any suitable rate. For example, downsampler 224 can average groups of pixels, where the groups can be of any suitable size (e.g., $2^s$ for a suitable scale S, such as 4, 16, or 32 pixels, etc.) depending on the given rate. By downsampling the image data at a higher rate/scale, downsampler 224 can generate a wider vertical stripe without increasing the amount of memory needed to store the vertical stripe. Thus, for the example of FIG. 3, downsampler 224 may downsample the first nine vertical stripes using a first rate (or first scale S1), the next four vertical stripe using a second rate (or second scale S2) greater than the first rate, and the last vertical stripe using a third rate (or third scale S3) greater than the first and second rates.

Image buffer 226 can be used for storing the downsampled image data from downsampler 224. Image buffer 226 can include any suitable form of volatile memory, such as SDRAM or RAM, or can include non-volatile memory. The downsampled image data may be stored and/or read out in any order (e.g., raster order or Z-order). The Z-order is discussed in greater detail in G.B. Patent Application No 0910387.0, filed Jun. 16, 2009, entitled "USE OF Z-ORDER DATA IN AN IMAGE SENSOR," which is incorporated herein by reference in its entirety. Image buffer 226 can be sized to store less than an entire frame of a scene. In fact, as described in greater in connection with FIGS. 4 and 5, image buffer 226 may be sized to store a portion of a vertical stripe.

Image buffer 226 may be operated as a "rolling buffer," in which the oldest data is overwritten after image buffer 226 is filled up. Object detector 228 may perform face detection using the contents of image buffer 226 while image buffer 226 is being filled. To ensure that all faces are detected, object detector 228 may operate at a speed fast enough so that detection is completed on a set of stored pixels before those pixels are overwritten.

Figure 4:
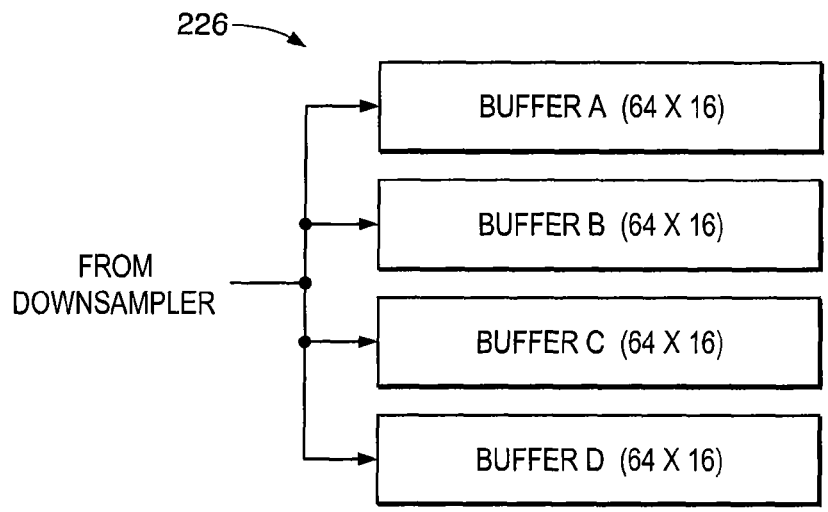
FIG. 4 is a schematic view of an illustrative image buffer configured in accordance with embodiments of the invention.
Figure 5:
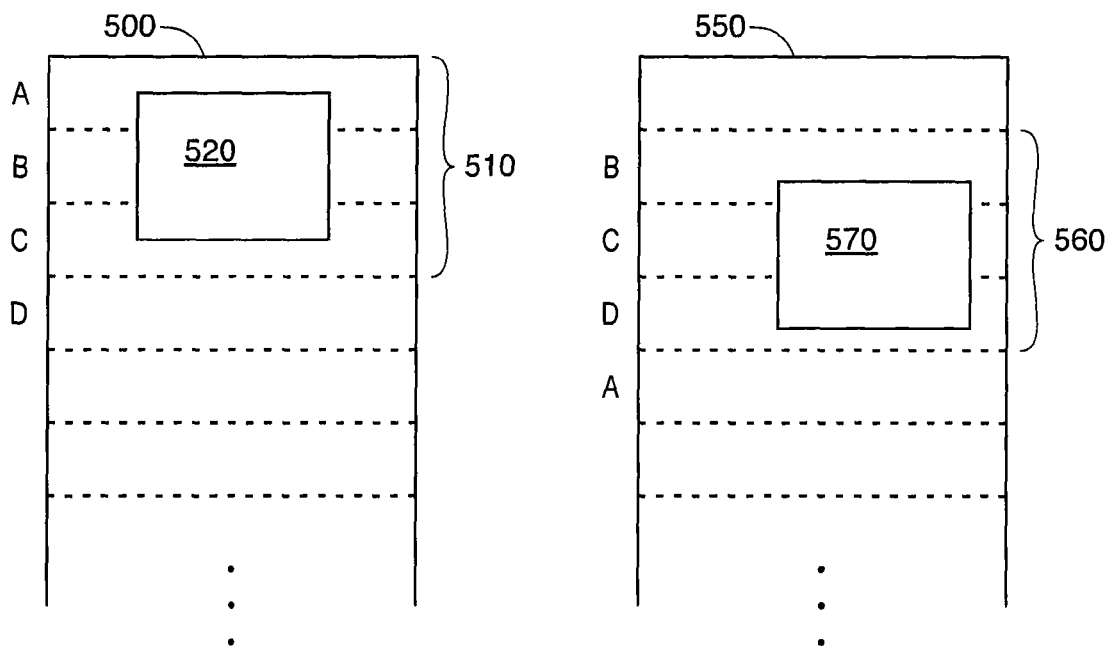
FIG. 5 illustrates various blocks selected from scanned stripes that can be used for object class detection in accordance with embodiments of the invention.

Turning now to FIGS. 4 and 5, these figures illustrate how object detector 228 can perform face detection while image data is being scanned into image buffer 226. In particular, FIG. 4 is a more detailed schematic view of some embodiments of image buffer 226, and FIG. 5 illustrates how object detector 228 might operate in conjunction with image buffer 226. Thus, FIGS. 4 and 5 will be described with continued reference to the components of FIG. 2.

Turning first to FIG. 4, in some embodiments, image buffer 226 can include four separate buffers so that three buffers are available for face detection while image data is being scanned into the fourth buffer. The four buffers in FIG. 4 are labeled as Buffers A, B, C, and D. The four buffers may be referred to as "partitions" of image buffer 226, although it should be understood that the four partitions can be completely separate buffers or four parts of the same buffer. In other embodiments, image buffer 226 can include more or less than four partitions.

Each of Buffers A, B, C, and D can have any suitable size. As one example, each of Buffers A, B, C, and D can include 64 pixels×16 lines of storage. In some embodiments, Buffers A, B, C, and D may each include two buffers—one to hold odd lines of a vertical stripe and the other to hold even lines.

Referring now to FIG. 5, one way to fill Buffers A, B, C, and D with portions of a vertical stripe is shown. FIG. 5 shows vertical stripes 500 and 550, which represent the same vertical stripe but at different points in time. Vertical stripes 500 and 550 may be scanned and stored into image buffer 226 in raster order. In particular, starting at the top of vertical stripe 500, the first set of lines (e.g., 16 lines) of vertical stripe 500 may first be stored in Buffer A, and then the second set of lines (e.g., 16 lines) may be stored in Buffer B, etc. While the fourth set of lines is stored in Buffer D, Buffers A, B, and C may contain valid data corresponding to top portion 510. Thus, object detector 228 may detect faces in top portion 510 at the same time that Buffer D is being filled. If each of Buffers A, B, C, and D is 64 pixels wide×16 lines, top portion 510 may be 64 pixels wide×48 lines.

To perform detection, object detector 228 can select blocks of a predetermined size (e.g., 32 pixels×32 pixels). For example, object detector 228 can select block 520, as well as blocks of this size at any other position within top portion 510. The number of blocks that are selected may depend on the speed at which face detection can be performed on each block, since eventually the data in Buffer A may be overwritten once Buffer D is filled up.

Object detector 228 can analyze each block and may determine whether a face is centered within each block. Object detector 228 can use any of a variety of techniques for identifying whether a face is present in a block. For example, object detector 228 can determine whether the location of edges and smooth portions in the block indicate that a face is centered within the block. Edges may be present, for example, at the eyes and nose of a face, while smooth portions may be present on the forehead of a face. In some embodiments, object detector 228 may perform face detection using any of the techniques discussed in the above-incorporated U.K. Application No. 0910386.2.

Once Buffer D is filled up, the first set of lines stored in Buffer A may be overwritten with the fifth set of lines in the vertical stripe. This scenario is illustrated by vertical stripe 550 of FIG. 5. Since Buffer D is now filled with valid image data, Buffers B, C, and D may contain valid data corresponding to portion 560 of the vertical stripe. Thus, while Buffer A is being filled, object detector 228 can select blocks of the predetermined size (e.g., 32×32 blocks) from Buffers B, C, and D, such as block 570, and perform face detection on these blocks.

Accordingly, as illustrated by vertical stripes 500 and 550 in FIG. 5, face detection can be performed concurrently with the raster scan of downsampled image data. Image buffer 226 may therefore have a size that is not only smaller than the size of a frame store, but can be smaller (even significantly smaller) than the size of a vertical stripe. This can enable a practical implementation of a detector within an image sensor, which might otherwise be infeasible.

Returning to FIG. 2, if object detector 228 detects the presence of a face within a 32×32 block, object detector 228 may save positional information corresponding to that block in region-of-interest buffer 230. The positional information can include, for example, the location of the block (e.g., the x,y coordinates of a corner of the block), the downsampling rate used to obtain the block, and the strength of detection. This way, object detector 228 can indicate a general region (e.g., a 32×32 block) that may be of interest to, for example, control circuitry 120 of FIG. 1.

In some embodiments, region of interest buffer 230 may be a first-in first out (FIFO) buffer. In these embodiments, information about the detected faces may be provided from buffer 230 in the order that the faces are detected. Image sensor 200 may include second output 232, which allows image sensor 200 to provide the positional information from region of interest buffer 230 to external components (e.g., control circuitry, such as control circuitry 120 of FIG. 1). Image sensor 200 may provide the positional information from buffer 230 at any suitable time, such as in response to requests from the external components or automatically.

Figure 6:
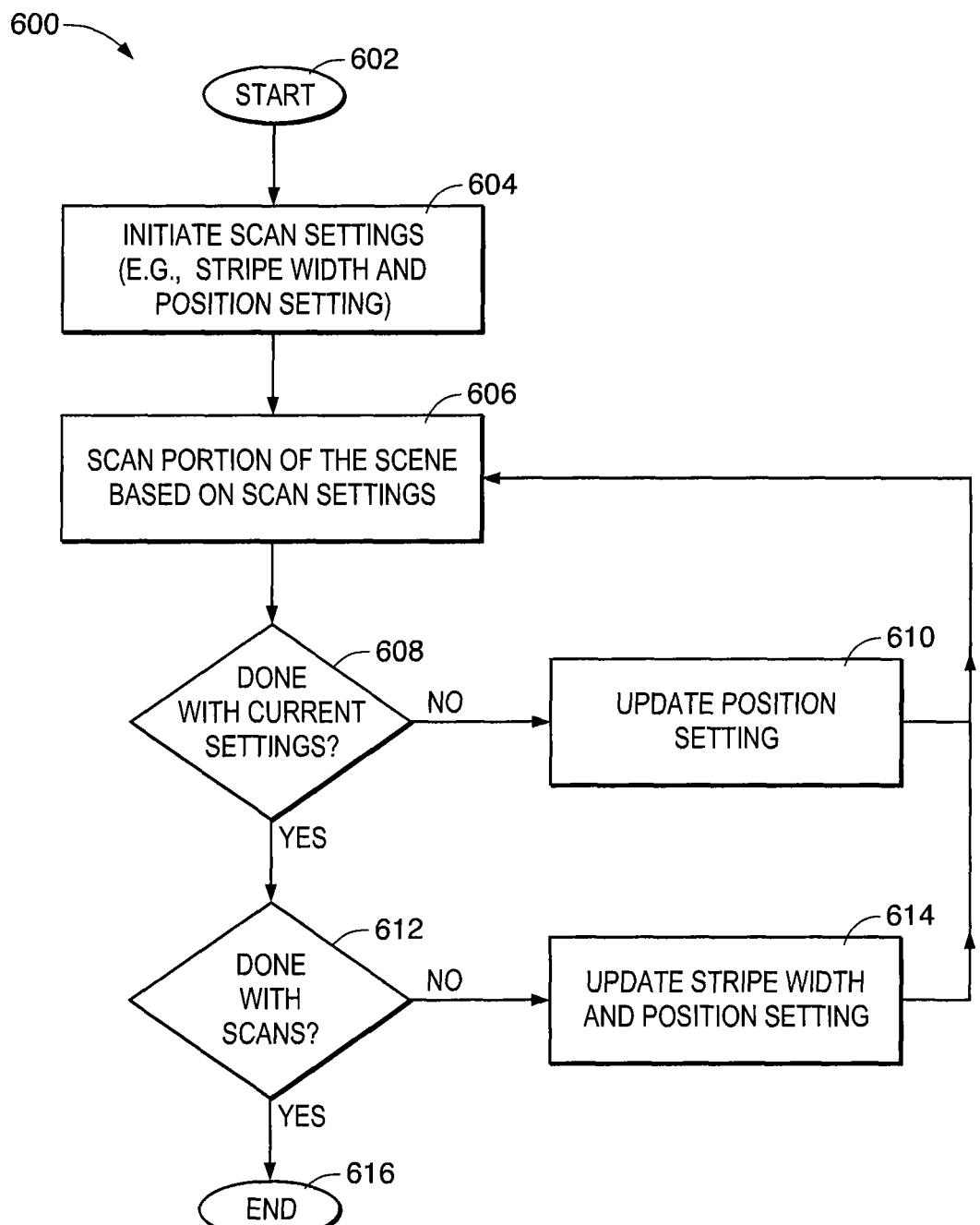
FIG. 6 is a flowchart of an illustrative process for scanning a scene in successive time intervals in accordance with embodiments of the invention.
Figure 7:
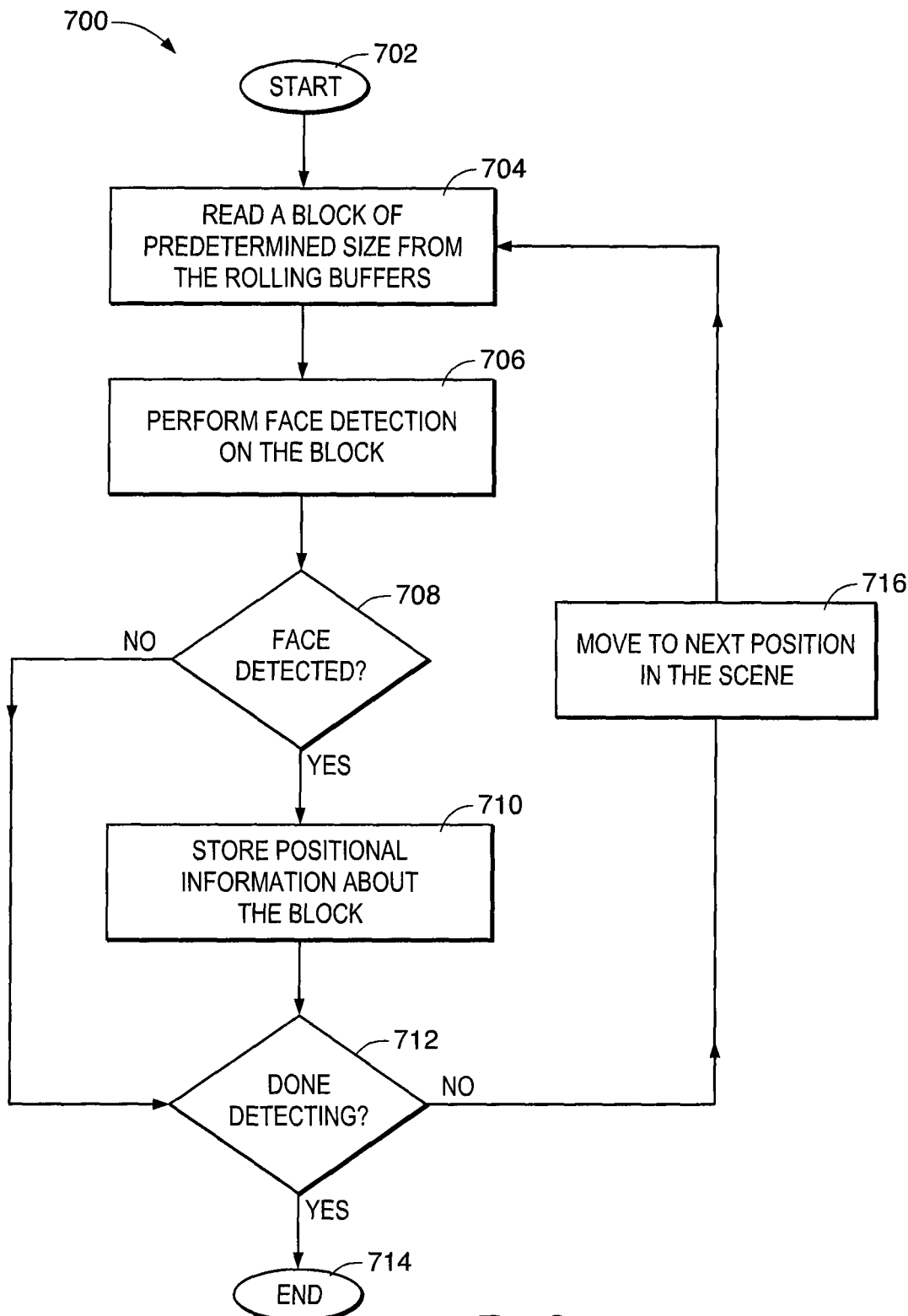
FIG. 7 is a flowchart of an illustrative process for performing face detection in accordance with embodiments of the invention.

FIGS. 6 and 7 are flowcharts of illustrative processes that can be executed by a sensor to achieve some of the above-described features and functionalities. In particular, the processes may be executed by an image sensor configured in accordance with embodiments of the invention, such as image sensor 110 or image sensor 200 of FIGS. 1 and 2, respectively. For example, the processes may be executed by a detector implemented within the image sensor. It should be understood that these processes are merely illustrative, and that any steps can be removed, modified, combined, or any steps may be added, without departing from the scope of the invention.

Referring first to FIG. 6, process 600 is shown for scanning a scene in successive time intervals in accordance with embodiments of the invention. Process 600 begins at step 602 in which scanning may or may not have already commenced. At step 604, the sensor can initiate various scan settings, which can include the stripe width and position settings (e.g., x-y coordinates of the scanning stripe, or the horizontal offset of the vertical stripe). The stripe width may be defined, for example, by a downsampling rate.

Then, at step 606, the image sensor can scan a portion of the scene based on the scan settings. For example, the image sensor can scan a vertical stripe of the scene that has a width and horizontal offset defined by the settings initialized in step 604. The image sensor may then, at step 608, determine whether it is finished scanning stripes of that width. This determination can be based on whether the image sensor has achieved sufficient coverage of the scene using the current width. If not, the image sensor can update the position setting (but not the stripe width) at step 610 so that the image sensor can scan another stripe of the same width at step 606.

If, at step 610, the image sensor instead determines that it is done with the current stripe width, process 600 can continue to step 612. At step 612, the image sensor can determine whether all scans in the sequence are complete. For example, using the example of FIG. 3, the image sensor can determine whether all 14 vertical stripes of sequence 300 have been completed. If so, the image sensor may have sufficiently covered the entire scene using scans in successive time intervals, and process 600 can end at step 616. At this point, the image sensor may stop performing scans. In other embodiments, the image sensor can repeatedly perform the sequence of scans (e.g., sequence 300 of FIG. 3), and process 600 can return to step 604 to start the next iteration.

Returning to step 612, if the image sensor determines that the scan sequence is not complete, process 600 may move to step 614. This may occur, for example, if the image sensor has not yet performed scans having a particular stripe width. Thus, at step 614, the image sensor can update the stripe width and position settings of the scan settings. The image sensor may update the scan settings, for example, to increase the stripe width (e.g., by increasing the rate of downsampling). Process 600 may then move back to step 606 so that the image sensor can scan a portion of the scene using the updated scan settings.

Using the steps of process 600, the image sensor can complete a sequence of scans of a scene, where the sequence includes scans of different widths and of different positions. This way, since faces or other objects can be positioned at a variety of different locations in the scene and can be a variety of different sizes (e.g., based on how far the person is away from the camera), the sequence may enable the image sensor to detect any faces present in the scene.

Turning now to FIG. 7, process 700 is shown for performing face detection in accordance with embodiments of the invention. Process 700 may begin at step 702 in which image data (e.g., pixels or downsampled pixels) has been stored in a rolling buffer (e.g., image buffer 400 of FIG. 4) and may be continuously stored in the rolling buffer in a circular fashion. Moving to step 704, the image sensor can read a block of predetermined size from the rolling buffer. The block can be of any suitable size, such as 32×32 or 64×64, and can be at any suitable position in a scanning stripe. Then, at step 706, the image sensor may perform face detection on the block. For example, the image sensor can determine whether the features (e.g., edges or lack thereof) indicate that a face is likely present within the block, and can use any of the detection techniques described in the above-incorporated Application No. 090386.2.

If, at step 708, the image sensor determines that a face is present in the block, process 700 can continue to step 710. At step 710, the image sensor can store positional information about the block. In some embodiments, the image sensor can store the positional information in a FIFO, which can be read by components external to the image sensor. The positional information can include, for example, the location of the predetermined block (e.g., the x,y coordinates of a corner of the block), the size of the block (e.g., rate of downsampling used to obtain the block), and the strength of face detection. Process 700 can then continue to step 712, described below.

Returning to step 708, if the image sensor determines that a face is not present in the block, process 700 may skip step 710 and move directly to step 712. At step 712, the image sensor can determine whether it is done detecting faces. This determination can be based on user request to perform another task that does not require face detection (or any other suitable factor). If the image sensor determines that face detection is no longer necessary, process 700 can move to step 714 and end. Otherwise, process 700 can continue to step 716 and the image sensor can move to the next position in the scanning stripe. That is, the image sensor can select another position in the scene at which to select a block. In some embodiments, the next position can produce a block that overlaps with the current block, but may be offset by a preset number of pixels. Process 700 may move back to step 704 so that face detection can subsequently be performed on the next block. By repeating the steps of process 700 for multiple blocks at different positions, the image sensor may be able to detect faces located at any spot and at any scale in the scene.

In conclusion, various embodiments are disclosed for scanning a scene and detecting the presence of objects of an object class. In some embodiments, an electronic device is provided which includes an image sensor and control circuitry. The image sensor provides, to the control circuitry, image data corresponding to a scene, as well as positional information about objects (of the object class) in the scene. The image sensor can include an image scanner that is configured to scan, in successive time intervals (e.g., frames), portions of a scene. Each of the portions may cover a different amount or location of the scene such that the portions collectively provide a relatively complete picture of the scene.

The image sensor can further include an object detector configured to analyze each of the portions while that portion is being scanned. The object detector can, for example, identify whether there are objects of the object class in the scene, and can generate the positional information that is provided to the control circuitry.

In some embodiments, the image sensor can include two buffers. The first buffer may be a rolling buffer that is used to store the image data as the image data is being scanned. At the same time, the object detector can read blocks of data out of the first buffer and can perform, for example, face detection on each of the blocks. The first buffer can be sized to store a portion of the scene (rather than the entire scene), so image data may be continuously rewritten as a scan occurs. Because the first buffer may be significantly smaller than a framestore, the first buffer may be suitable for implementation within an image sensor (e.g., SoC). The second buffer, which may be a FIFO buffer, may store the positional information of any of the blocks that include detected faces.

Thus far, low cost methods have been described for detecting objects in an object class, such as faces. One described method searches one strip of an image per frame, and moves across the image, or down in scale, in successive frames. In one embodiment, the method takes 14 frames (typically just under ½ second at 30 frames per second) to find all of the faces of an image. This is acceptable for locating the faces within an image, but once a face is located a method to track the face at a higher frequency is desired. The following describes methods to track faces efficiently using one or more detection blocks.

The "tracking" herein refers to outputting face locations every frame or at least significantly more often than once per detection cycle. The "tracking" does not necessarily assure that the faces found are the same faces between frames, as no actual comparison is made. The comparison, however, may easily be implemented by the present invention but requires additional processing. For many uses of the face tracking methods, finding a face near a face detected on a previous frame is sufficient for tracking. The likelihood of it being the same face is very high.

It will be understood that the aforementioned 14 frames to complete a face detection scan across an image is just one embodiment. Changes in the requirements relating to the sizes of faces that must be found, the amount of available memory, the sensor resolution and other factors may cause a change from this number. The count of 14 frames to complete a search, however, is used in the rest of this disclosure as a convenient example.

As will be described, two different hardware implementations are used as examples of devices to detect and track one or more faces in an image. The first implementation uses one detection block, as shown, for example, in FIGS. 8 and 10; the second implementation uses two detection blocks, as shown, for example, in FIGS. 9 and 11. These figures are described below.

Figure 8:
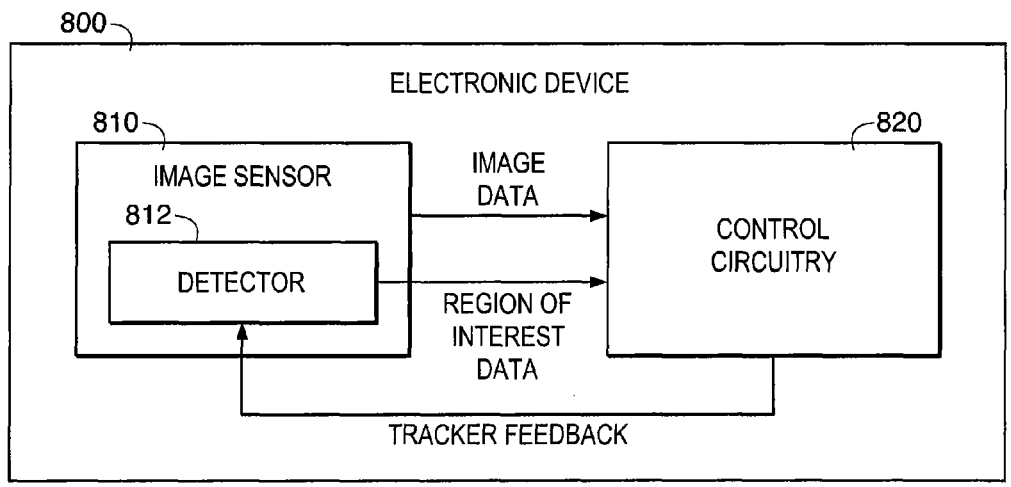
FIG. 8 is a schematic view of an illustrative electronic device for detecting and tracking one or more faces in a scene configured in accordance with embodiments of the invention.

Referring now to FIG. 8, there is shown electronic device 800 which includes elements similar to electronic device 100. Electronic device 800 includes image sensor 810 and control circuitry 820. Image sensor 810 includes detector 812 for identifying relevant information about the scene. For example, detector 812 may analyze the image data for the presence of predetermined objects. These objects may belong to a particular object class, such as faces. As detector 812 detects the presence of a face, the detector provides information about the detected face (or faces) to control circuitry 820. The relevant information is shown as "region of interest data (ROI data)" and may include positional information about each of the detected faces, such as a general location of each face. For example, the ROI data may include x,y coordinates and the size of the face, and how confident image sensor 810 is of the presence of the face at each location of the frame.

Control circuitry 820 may process the image data and region of interest data generated by image sensor 810, and may perform any suitable operation based on this data. As shown, one operation provided by control circuitry 820 includes tracker feedback that informs detector 812 of the detection of a face within a particular region of interest (which may be a particular vertical stripe as shown in FIG. 3). After being informed of the detection of a face within the particular region of interest during one frame period, detector 812 may be programmed to scan another region of interest (also referred to herein as a tracking region of interest) different from the next in the detection sequence during the next frame period of the image. For example, in one frame, detector 812 scans a region of interest (a vertical stripe, for example) and detects the presence of a face. Upon detection of the presence of a face, detector 812 is programmed to track the same face in the same or overlapping region of interest, during the next frame, or during every other frame, or some other period.

Figure 9:
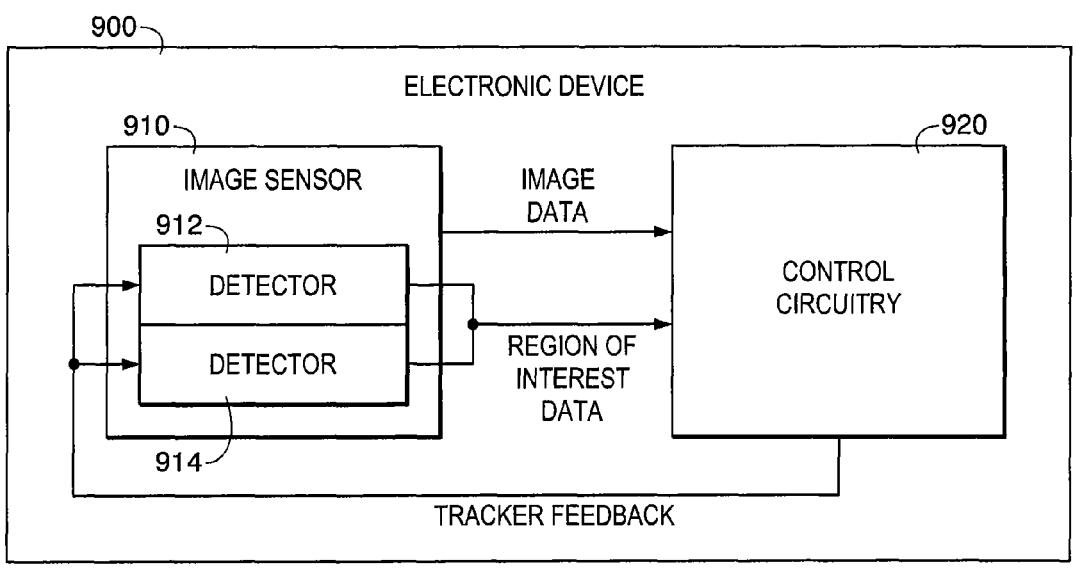
FIG. 9 is a schematic view of another illustrative electronic device for detecting and tracking one or more faces in a scene configured in accordance with embodiments of the invention.

Referring next to FIG. 9, there is shown electronic device 900 which includes image sensor 910 and control circuitry 920. Different from image sensor 810, image sensor 910 includes two separate detector blocks, designated 912 and 914, respectively. Control circuitry 920 provides a tracker feedback signal to image sensor 910 to change scanning in detector 912 and/or detector 914, so that one detector, may track the previously detected face in the same or overlapping region of interest. For example, if a face is detected in a particular region of interest (for example a vertical stripe) during a frame, then control circuitry 920 may inform image sensor 910 of the detection, so that either detector 912 or detector 914 may track the previously detected face within the same or an overlapping region of interest.

As another example, image sensor 910 may be programmed to allow detectors 912 and 914 to work together to scan successive vertical stripes of the image, where two vertical stripes are scanned during one frame of the image. This halves the time to complete a detection cycle in the example from 14 frames to 7 frames. Upon completion of a detection cycle in which one face is detected in one of the vertical stripes (shown in FIG. 3) by detector 912 or detector 914, one of the detectors, for example 914, may be programmed to track the detected face in a tracking region of interest during the next frame, by centering the next region of interest on the face in both location and scale. In this manner, detector 912 continues to provide its usual scanning of the image within the 14 vertical stripes shown in FIG. 3, in which each vertical stripe is scanned during one frame period. In this example, image sensor 910 takes 14 frames to complete a new detection scan. The detector 914, however, is programmed to start tracking another region of interest, in which the tracking region of interest is set-up based on positional coordinates of the detected face using the latest data on its location. In this example, detector 914 continues to track the same face every frame. Thus, as an example, detector 914 may be switched from detection to tracking only after a face is detected by either detector 912 or 914; in this manner, one detector is programmed to detect a face during successive frames, and the other detector is programmed to track a face during successive frames.

Figure 10:
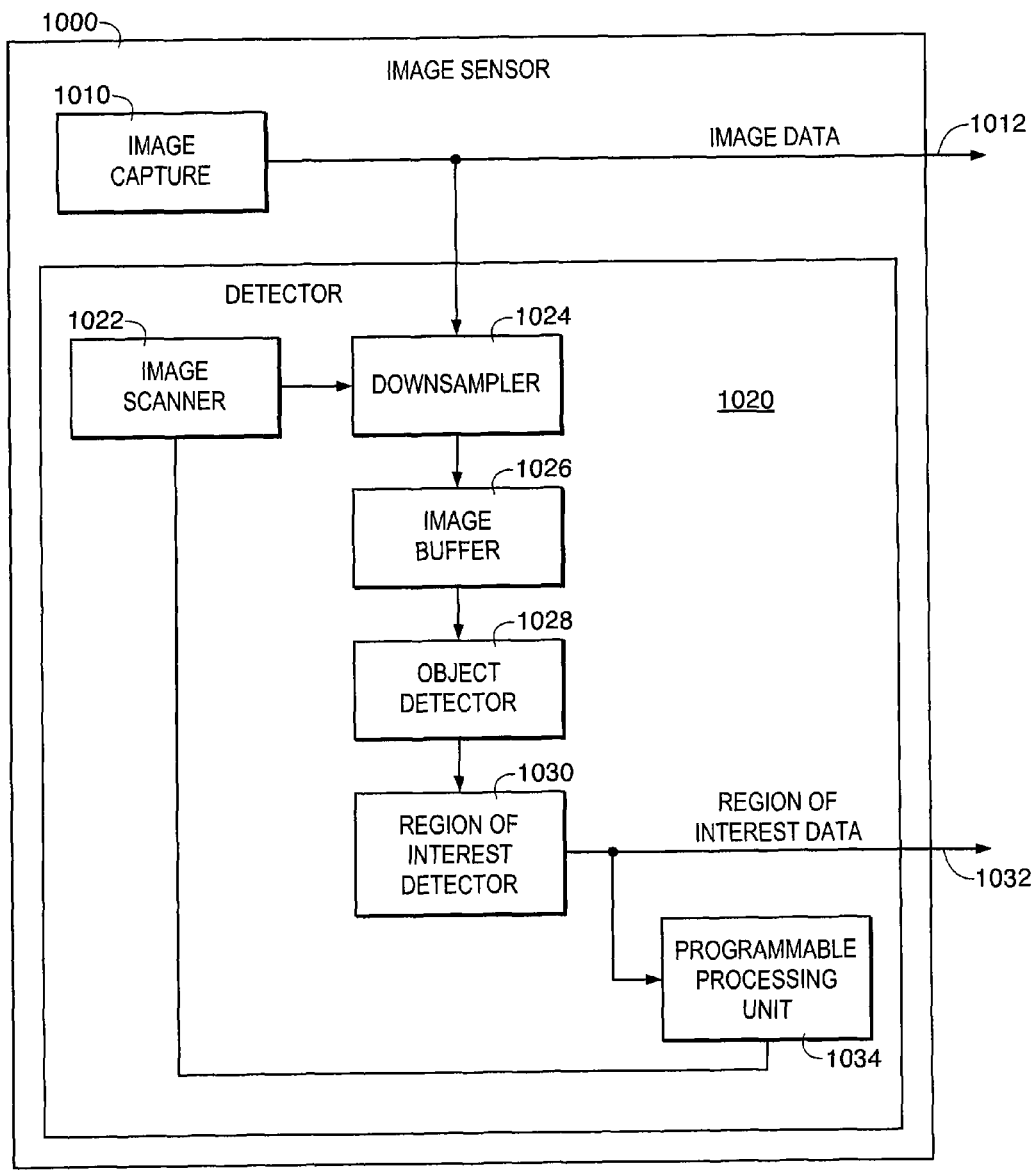
FIG. 10 is a schematic view of an illustrative image sensor included in the electronic device shown in FIG. 8.
Figure 11:
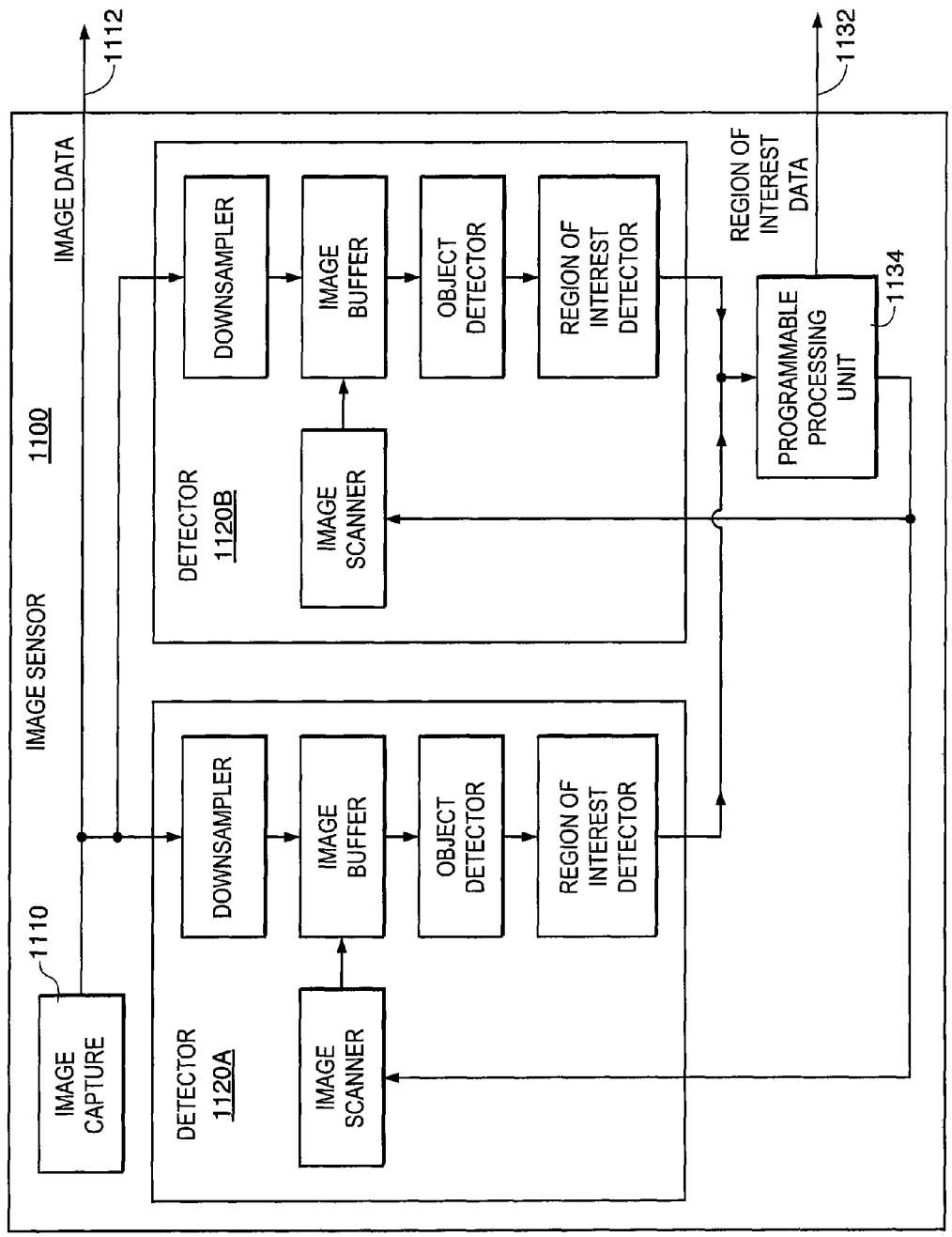
FIG. 11 is a schematic view of another illustrative image sensor included in the electronic device shown in FIG. 9.

More detail of the image sensors of electronic devices 800 and 900 is shown in FIGS. 10 and FIG. 11, respectively. Referring first to FIG. 10, image sensor 1000 includes image capture device 1010, which provides image data to an external control circuit, such as control circuit 820, and detector 1020. As shown, detector 1020 includes image scanner 1022, downsampler 1024, image buffer 1026, object detector 1028, and region of interest detector 1030. The region of interest detector 1030 provides region of interest data, designated as 1032, to control circuit 820 and programmable processing unit (PPU) 1034. The PPU 1034 provides feedback to image scanner 1022, in order to control the scanning of the detector.

It will be appreciated that image sensor 1000 shown in FIG. 10 includes the same elements of image sensor 200 shown in FIG. 2. One difference in FIG. 10, however, is the inclusion of PPU 1034 for operating and controlling image scanner 1022. Thus, upon detection of a face in a region of interest during one detection or tracking cycle, programmable processing unit 1034 provides tracker feedback to image scanner 1022 and controls the subsequent scanning of another region of interest during the next frame period. For example, image scanner 1022 may deviate from scanning the next vertical stripe in the detection sequence and, instead, scan the vertical strip centered on the previously detected face. The positional information of the tracking region of interest may be based on predicted motion of the detected face, and the desired frequency in tracking that face.

It will be appreciated that whether a frame period is devoted to a detection scan or a tracking scan is a function of programming by the user in PPU 1034. As one example, image scanner 1022 may devote one vertical stripe to detect an image in one frame. If a face is detected, image scanner 1022 may be programmed to track the same face during the next frame. Thus, there are scanning periods for detection and scanning periods for tracking.

It will be understood that although FIG. 10 shows PPU 1034 residing within detector 1020, it may also reside externally of detector 1020. For example, PPU 1034 may reside within control circuitry 820.

Referring next to FIG. 11, there is shown image sensor 1100, which includes elements similar to image sensor 1000. A difference between image sensor 1100 and image sensor 1000 includes the presence of two detectors 1120a and 1120b. Detector 1120a or 1120b includes elements that are similar to corresponding elements shown in detector 1020. Thus, each detector includes an image scanner, a downsampler, an image buffer, an object detector and a region of interest detector. The output signals from both regions of interest are provided to PPU 1134. One output of PPU 1134 is provided as region of interest data, designated 1132, to control circuit 920. Another output from PPU 1134 is fed back to the image scanner of a respective detector 1120a or 1120b. The PPU 1134, thus, controls the positional information required for beginning and end of a scan of a particular vertical stripe during the detection or tracking cycles.

Since two detectors are included within image sensor 1100, the invention permits simultaneous scanning for face detection and scanning for face tracking. For example, detector 1120a may continue scanning 14 vertical stripes of an image, in order to detect a face during a particular frame period out of the total scanning time of 14 frame periods. Detector 1120b, on the other hand (for example) may only be activated after detection of a face during a particular frame period in which a vertical stripe has been scanned. Alternatively, when no face has been detected, both detectors 1120a and 1120b may share the detection effort. During each frame two stripes may be scanned. Thus, the detection time for a new face may be cut in half from 14 frames to 7 frames in the example. Once a face is detected, detector 1120b may be dedicated to tracking rather than detection. In this manner, detector 1120b continuously tracks the previously detected face, every frame period. In the case were the two faces are detected, detector 1120a may continue the detection scans to find new faces. Detector 1120b may alternate tracking the two faces. In one frame, detector 1120b's region of interest may be centered on the first face. In the next frame, detector 1120b's region of interest may be centered on the second face. This sequence may then repeat tracking each face every other frame.

Figure 12:
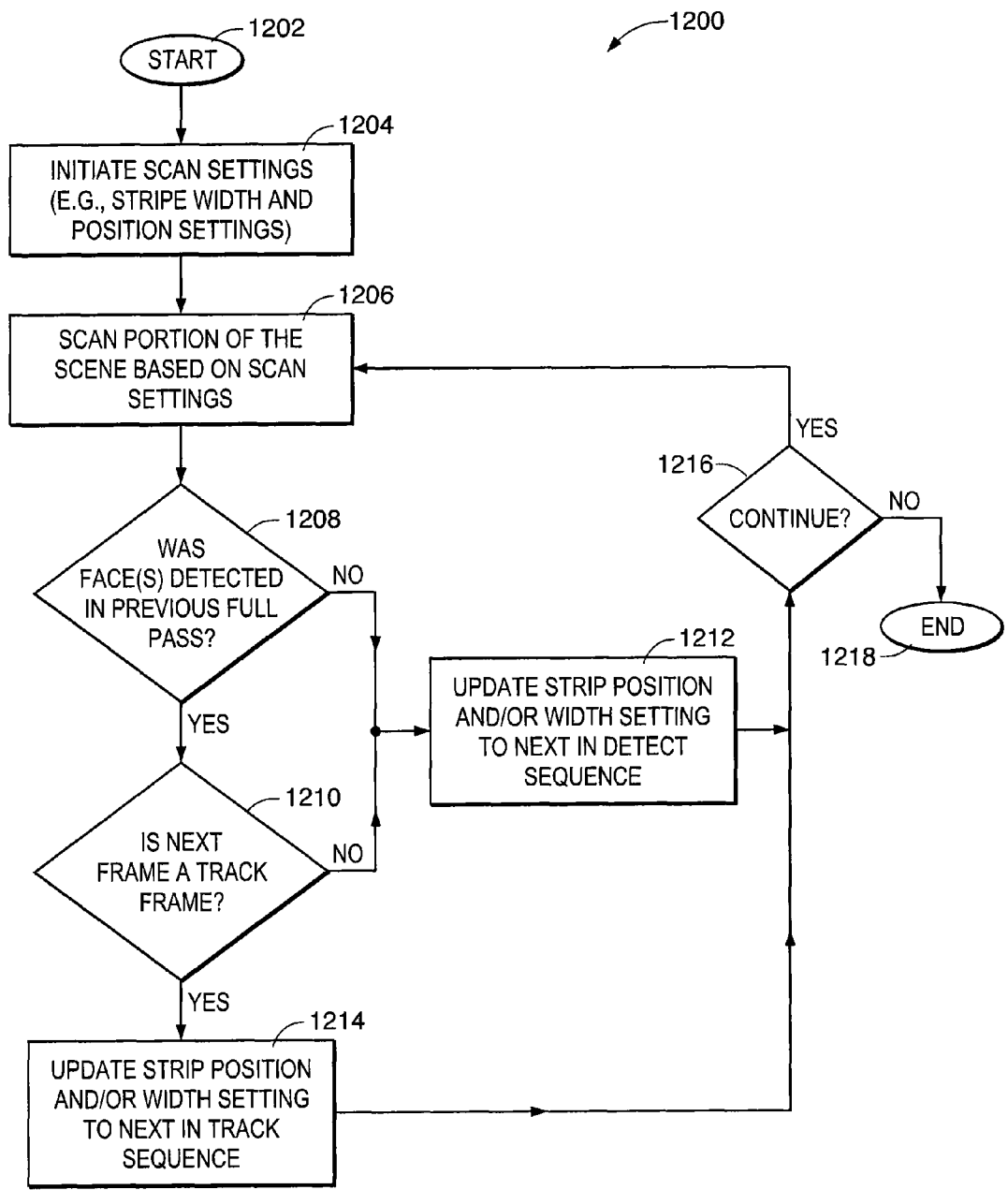
FIG. 12 is a flowchart of an illustrative process for scanning a scene in successive time intervals to detect a face, and tracking a portion of the scene in successive time intervals, after a face is detected, in accordance with embodiments of the invention.

Examples of methods for operating electronic devices 800 and 900 will now be described by referring to the flow diagrams in FIGS. 12 and 13, respectively. Referring first to FIG. 12, method 1200 starts in block 1202. Step 1204 initiates the scan settings for the regions of interest. For example, each scan setting may be based on positional information of a respective vertical stripe (14 vertical stripes are shown in FIG. 3, as an example). Step 1206 scans a portion of the scene based on the scan settings, where the scanning time of each scan setting occurs during one frame period. Method 1200 next enters decision box 1208 to determine whether a face is currently being tracked. A face is being tracked if at the end of a detect cycle one or more faces were detected, or if the method is currently tracking a face. If method 1200 determines that a face is not being tracked, the method branches to step 1212 and updates the vertical stripe's positional information to the next one in the detection sequence. The method continues the operation by way of decision box 1216 and either branches back to step 1206 for scanning another portion of the scene, or branches to step 1218 in order to end the operation.

If decision box 1208 determines that a face is being tracked, the method branches to another decision box, namely box 1210. This decision box determines whether the next frame is to be a tracking frame or a detection frame. If the next frame is to be a tracking frame, the method branches to step 1214 and updates the region of interest based on the latest positional information for the detected face. The method is continued by branching back to decision box 1216. If more than one face has been detected and they are being tracked, box 1214 may select the region of interest to track one (or more if the faces occur in the same region of interest) at a time, thereby tracking the multiple faces sequentially.

If, on the other hand, decision box 1210 determines that the next frame is not a tracking frame (in other words, it is a detection frame), then method 1200 branches to step 1212, in order to update the positional information for the next vertical stripe in the detection sequence. In this manner, method 1200 interleaves detection frames for a face (or faces) with tracking frames for a face (or faces).

Figure 13:
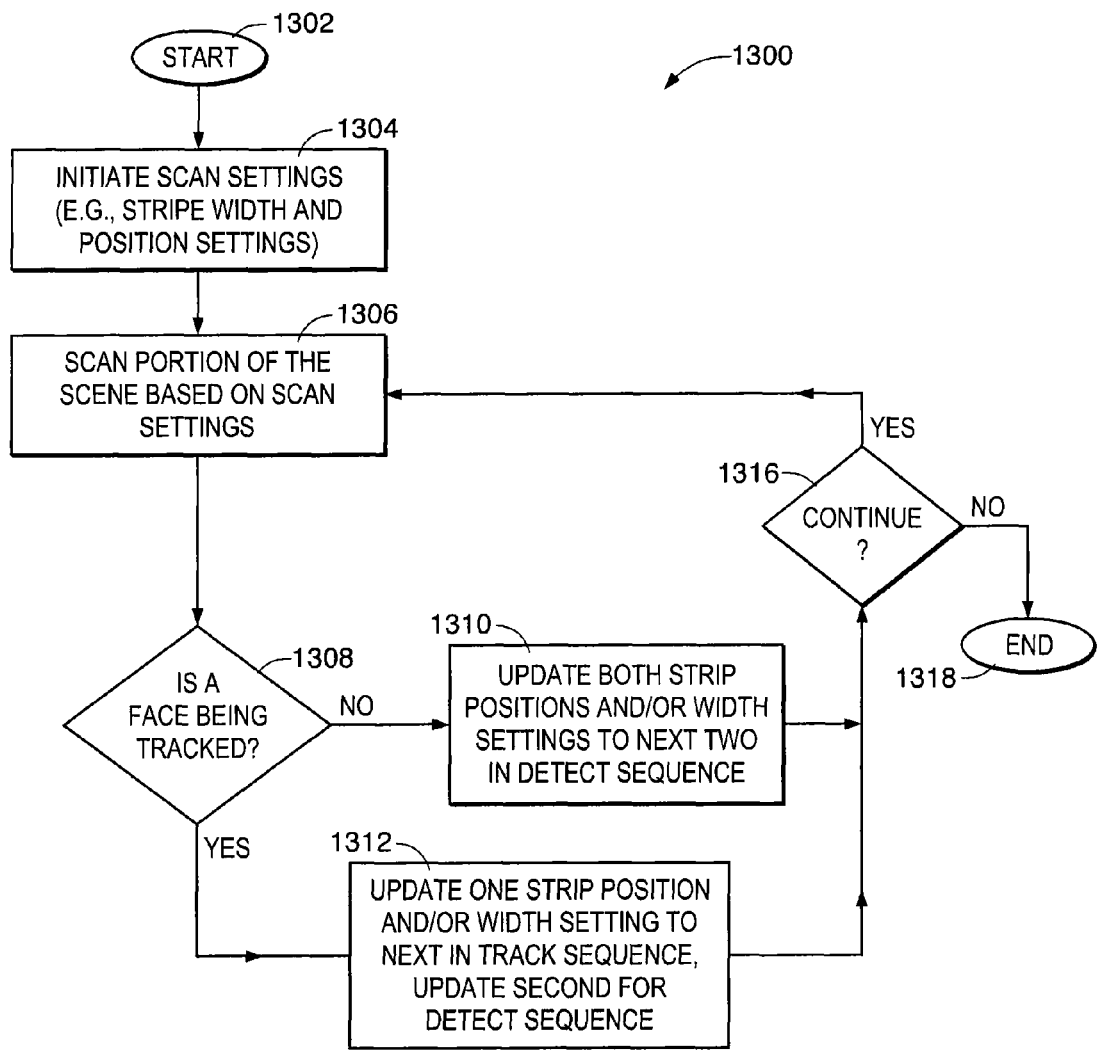
FIG. 13 is another flowchart of an illustrative process for scanning a scene in successive time intervals to detect a face, and simultaneously tracking a portion of the scene in successive time intervals, after a face is detected, in accordance with embodiments of the invention.

Method 1300 shown in FIG. 13 is now described next. This method is based on the electronic device shown in FIG. 9 which includes two detector blocks. As shown, method 1300 starts at step 1302 and initiates a scan setting for a vertical stripe using step 1304. Step 1306 scans a portion of the scene based on the scanned settings (actually two regions of interest, one per detector). Stated differently, step 1306 scans the next two vertical stripes of the image scene to detect a face (or faces).

The method next enters decision box 1308 and determines whether a face is being tracked. A face is being tracked if at the end of a detection sequence one or more faces were found, or if one or more faces are being tracked and the control circuitry determines they should continue to be tracked. If decision box 1308 determines that no face is being tracked, then the method branches to step 1310 and updates both vertical stripes' positional information for the next two vertical stripes in the detection sequence.

As another possibility, since two detector blocks are present in this embodiment of the invention, it is possible to scan the 14 vertical stripes in half the time, by allowing one detector block to scan 7 vertical stripes and the other detector block to scan the other 7 vertical stripes. In this manner, detection of a face (or faces) in the entire image may be accomplished in half the time period, using two detector blocks. The method is thus continued by updating the positional settings for the next two detection sequences of vertical stripes, as shown in step 1310. The method continues this by branching to decision box 1316, which loops back to scanning the next portion of the scene by way of step 1306. Step 1318 is entered, when the method stops detecting or tracking.

If decision box 1308, however, determines that a face is being tracked, the method branches to step 1312. This step updates the scan to the next vertical stripe position in the detection sequence for the first detector block (to continue detecting) and updates the vertical stripe position centered on a detected face for the second detector block (to track). Step 1318 is entered, when the method stops detecting or tracking.

One feature of the face detection method of the present invention is that one, two or more detection blocks may be used. If two detector blocks are included on a chip (for example, as shown in FIG. 9), two regions of interest may be searched at one time, or simultaneously. The two detector blocks may be used to search the 14 vertical stripes mentioned above in only 7 frames, cutting the detection time in half. Alternatively, if a face location is known, one of the detector blocks may scan the stripe from the detection sequence that best matches the predicted position and scale of the face, whereas the other detector block may continue to cycle through the remaining stripes in the detection sequence. As an example, if there is only one face in an image, the face may be tracked by one detector block every frame period during sequential tracking frames. The second detection block may continue sequentially scanning the remaining 13 vertical stripes, detecting new faces in the entire image every 13 frames.

Yet another method may be to change the location of the vertical stripe in order to most closely match the predicted position of the detected face in the next tracking frame. This will likely improve the tracking accuracy and reduce the chances of the face moving too far between frames in order to continue tracking the face in the next frame. This, however, means that it will take 14 frames to detect new faces, a small change from 13 frames.

If there are two faces detected within an image, and they are not within the same vertical stripe, an embodiment of the invention may use one of the detector blocks to alternately track the two vertical stripes containing the faces every other frame. Motion estimation may fill in the missing locations. The other detector block may continue to search the remaining vertical stripes for new faces.

Moving to a case with faces in three vertical stripes within the image, a method of the invention may still employ two face detection blocks. First, as with the two face case, one detection block may detect new faces in the entire image. The second block may then track the faces within the three vertical stripes; each face tracked every three frames. Motion estimation may fill in the missing locations.

A second option may be to slow down the detection process. One detection block may search for new faces every other frame, doubling the search time, and track the faces in one vertical stripe every other frame. The second detection block may track faces in the remaining two vertical stripes every other frame. Now detection takes longer, but as with the two faces case, the method accurately tracks all three faces every other frame.

Four faces may be the most that the present invention may contemplate without using an additional hardware detection block. Once again, there are multiple ways to both track and continue to detect new faces. A method may track each face every fourth frame with one detection block, and detect new faces with the second detection block. Alternatively, another method may detect new faces every other frame with one of the detector blocks and track the other frames with the second detector block. The second detector block would always be in the track phase. Using this method, tracking is performed an average of every 2.67 frames for each face, using motion prediction to output locations in between each tracking frame.

With two detection blocks, a worst case, no matter how many faces are in the image, is tracking every seven frames (for the situation with complete search requiring 14 vertical stripes), since this is what it takes to finish a scan of very vertical stripe in the image.

The described embodiments of the invention are presented for the purpose of illustration and not of limitation, and the invention is only limited by the claims which follow.

What is claimed:

1. A method of scanning a scene using an image sensor comprising:
   dividing the scene into multiple first portions;
   scanning a first portion for presence of objects in an object class;
   detecting an object in the object class in the first portion;
   scanning another first portion for presence of objects in the object class;
   selecting a second portion of the scene, in response to detecting the object in the first portion; and
   tracking the object in the second portion of the scene.

2. The method of claim 1 wherein
   scanning includes sequentially scanning the multiple first portions for presence of objects in the object class.

3. The method of claim 1 wherein selecting the second portion includes:
   estimating motion of the object detected in the first portion, and predicting location of the object in the scene, based on elapsed time between detecting the object in the first portion and tracking the object in the second portion.

4. The method of claims 1 wherein scanning includes
   sequentially scanning the multiple first portions, wherein each first portion is scanned during a duration of one image frame, and
   tracking the object includes tracking the object in the second portion during a duration of one image frame.

5. The method of claim 4 wherein
   sequentially scanning the multiple first portions is performed simultaneously with tracking the object in the second portion.

6. The method of claim 4 wherein
   sequentially scanning the multiple first portions is interleaved with tracking the object in the second portion.

7. The method of claim 6 wherein
   interleaving includes scanning a first portion in a first frame period, and then tracking the object in the second portion during a second frame period, wherein the second frame period is subsequent to the first frame period.

8. The method of claim 1 wherein scanning the other first portion includes
   detecting another object in the object class while scanning the other first portion, selecting another second portion of the scene, in response to detecting the other object, and tracking the other object in the other second portion.

9. The method of claim 1 wherein the object class includes faces.

10. The method of claim 1 wherein scanning the first portion includes scanning a first vertical stripe in an image frame, and scanning the other first portion includes scanning a second vertical stripe in the image frame, wherein the first and second vertical stripes have different horizontal offsets, and each has a width less than a width of the scene.

11. The method of claim 10 wherein the second portion of the scene includes a tracking region having a vertical stripe and a width that are different from the first and second vertical stripes and their respective widths.

12. An image sensor comprising:

an image scanner configured to scan, in succession, portions of a scene, wherein each of the portions covers a different amount or location of the scene;

an object detector configured to analyze at least one of the portions, while that portion is being scanned, for the presence of an object in an object class; and a programmable processing unit (PPU) for receiving positional information of an object in the object class;

wherein the PPU provides first and second controls to the image scanner, the first control enables the image scanner to scan the next successive portion of the scene for the presence of an object, and the second control enables the image scanner to track a tracking region of the scene, wherein the tracking region is based on predicted positional information of an object detected in a portion of the scene.

13. The image sensor of claim 12 wherein the object class includes faces.

14. The image sensor of claim 12 wherein the successive portions include a first plurality of vertical stripes with differing horizontal offsets, each having a first predetermined width; and a second plurality of vertical stripes with differing horizontal offsets, each having a second predetermined width; and the tracking region includes a vertical stripe with a predicted horizontal offset.

15. The image sensor of claim 12 wherein the PPU is configured to provide the first and second controls at different frame periods of successive image frames.

16. The image sensor of claims 12 wherein the PPU is configured to provide the second control during an image frame period immediately following an image frame period that detected a presence of an object during at least one of the portions.

17. An image sensor comprising:

a first image scanner configured to scan, in succession, portions of a scene, wherein each of the portions covers a different amount or location of the scene;

a first object detector configured to analyze at least one of the portions, being scanned by the first image scanner, for the presence of an object in an object class;

a second image scanner configured to scan, in succession, portions of the scene, wherein each of the portions covers a different amount or location of the scene;

a second object detector configured to analyze at least one of the portions, being scanned by the second image scanner, for the presence of an object in an object class; and a programmable processing unit (PPU) configured to receive positional information of an object detected by the first object detector or the second object detector, and provide control to at least one of the first and second image scanners for selecting another portion of the scene for tracking the object detected.

18. The image sensor of claim 17 wherein the PPU is configured to provide control to the first object detector to continue scanning in succession, portions of the scene for the presence of another object in the object class; and the PPU is configured to provide control to the second object detector to start tracking, in succession, other portions of the scene for the presence of a previously detected object.

19. The image sensor of claim 18 wherein portions of the scene include vertical stripes covering a different amount or location of the scene, and the other portions of the scene include tracking regions covering locations of the scene different from the vertical stripes.

20. The image sensor of claim 19 wherein the vertical stripes are used for the scanning in succession for detecting the presence of an object, and the tracking regions are used for tracking in succession a detected object, wherein a next tracking region is based on motion prediction of an object between successive frame periods.

* * * * *